Oct. 4, 1927.                                        1,644,264
B. J. MURN
STEERING COUPLING FOR TRAILERS
Filed Sept. 18, 1926         2 Sheets-Sheet 2

Inventor
Basil J. Murn
By his Attorneys
Williamson Reif & Williamson

Patented Oct. 4, 1927.

1,644,264

UNITED STATES PATENT OFFICE.

BASIL J. MURN, OF FOLEY, MINNESOTA.

STEERING COUPLING FOR TRAILERS.

Application filed September 18, 1926. Serial No. 136,277.

This invention relates to steering couplings for trailers and particularly to steering couplings adapted to be used with four wheel trailers.

It is an object of this invention to provide a steering coupling for four traction trailers adapted to be secured to a draft vehicle and to a trailer and adapted to operate to steer the front traction means of the trailer in such a manner that the trailer will take a turn in the same manner as the draft vehicle.

It is a further object to provide such a device which will steer the front wheels of a four wheel trailer in such a manner that the path taken by the front wheels of the trailer will follow the path taken by the rear wheels of the draft vehicle in the same manner that the path taken by the rear wheels of the draft vehicle will follow the path taken by the front wheels of the draft vehicle.

It is yet another object of the invention to provide a steering coupling for trailers which will steer a trailer to turn the same at a very sharp angle as the draft vehicle to which the coupling is attached is turned whereby the vehicle with the trailer attached can be reversed and turned around in very short space.

Still another object is to provide a steering coupling for trailers comprising a swingable draw bar adapted to be secured to the trailer and to the draft vehicle, a Y-shaped camway adapted to be secured to the draft vehicle and means adapted to be operated by the swinging movement of the draw bar and working in the camway for steering the front wheels of the trailer as the draw bar is swung.

These and other objects and advantages of the invention will be apparent from the following description made in connection with the accompanying drawings, wherein like characters refer to the same or similar parts throughout the several views, and in which.

Figure 1:
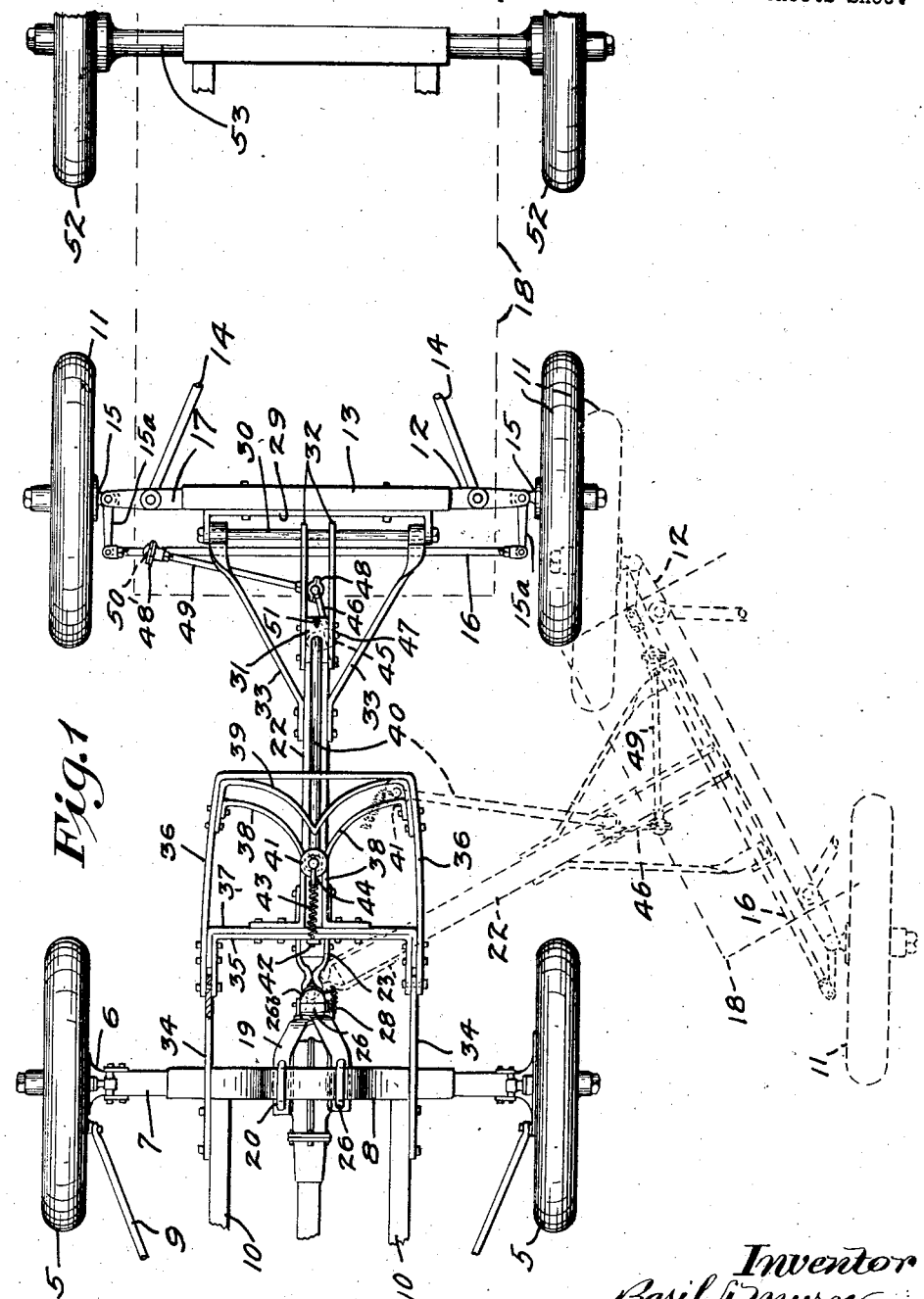
Fig. 1 is a plan view showing a portion of a chassis of an automobile and a portion of a four wheel trailer with the preferred embodiment of the present invention applied thereto, the device of the invention and the front end of the trailer being shown in full lines in one position and in dotted lines in another position.
Figure 2:
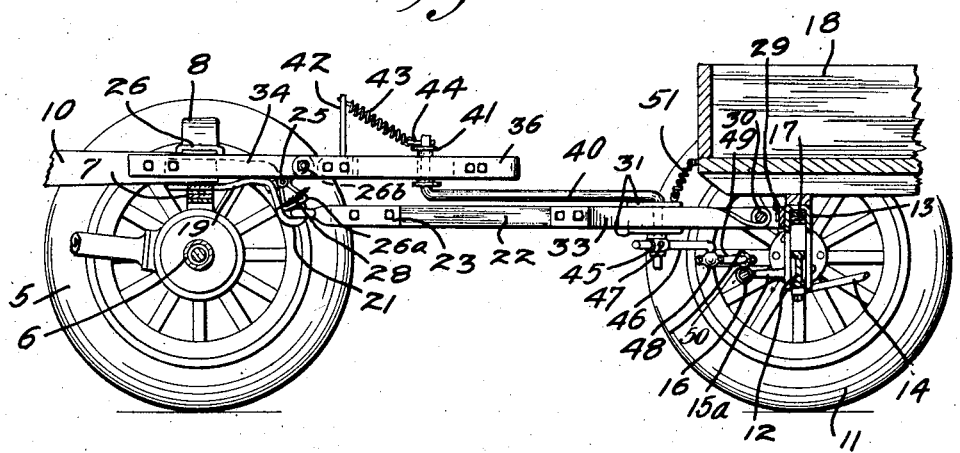
Fig. 2 is a view in side elevation of Fig. 1, certain of the parts being shown in section.
Figure 3:
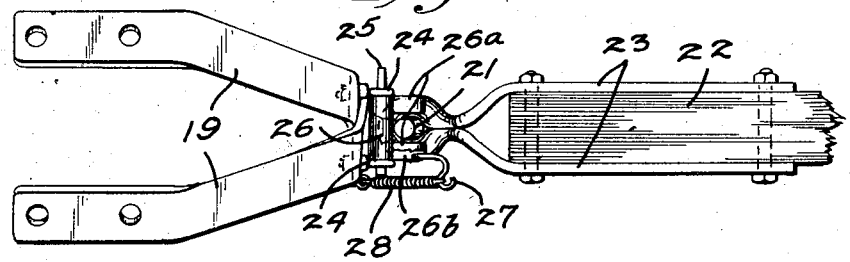
Fig. 3 is a plan view of one type of hitch that may be used, certain of the parts being broken away.
Figure 4:
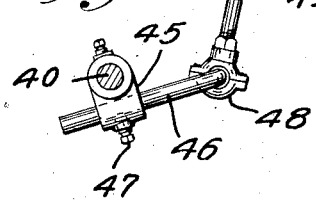
Fig. 4 is a plan view of portions of certain of the parts used.

Referring to the drawings, the rear end of the chassis of a standard automobile is illustrated including the rear wheels 5, rear axle 6, cross spring 7, rear body bolster 8, radius rods 9 and longitudinal frame members 10. A four wheel trailer is shown including the front wheels 11, rear wheels 52, front axle 12, rear axle 53, a front body bolster 13, front radius rods 14, steering spindles 15 having spindle arms 15$^a$ thereon, tie rod 16 connecting the spindle arms 15$^a$, front spring 17, and body 18. The said trailer construction is of a type now commonly used with the exception that in the present construction the spindle arms 15$^a$ are extended forwardly from the front axle rather than rearwardly and the tie rod 16 is placed forwardly of the front axle.

In accordance with the present invention a bracket 19 is secured preferably by U-clips 20 to the rear body bolster 8, of the automobile. The bracket 19 is formed from two arms bent rearwardly and then downwardly and inwardly and welded together at their rear portions, the rear ends thereof forming an upwardly extending hook or king bolt 21. A draw bar 22 of common construction has an eye strap 23 bolted thereto at its front end, the said eye being adapted to fit over the hook 21. A pair of eye bearings 24 are bolted to the bracket 19 adjacent the rear portion thereof and have journaled therein the pivot 25. Keeper 26 is preferably secured to pivot 25 between the bearings 24 and has downwardly extending forked portions 26$^a$ adapted to fit at either side of the hook 21 over the sides of the eye of the eye strap 23. Handle portion 26$^b$ is provided at the top of the keeper and a hook 27 is secured at the outer end of the handle portion, a tension spring 28 being secured at one end to the hook 27 and at its other end to an eye secured adjacent the rear portion of one side of the bracket 19. A U-shaped strap 29 is bolted or otherwise secured to the front body bolster 13 of the trailer and has extending therethrough the shaft 30. Bearing block 31 is secured to the rear end of the draw bar 22 and a pair of braces 32 extend rearwardly from the bearing block 31 and are journaled on the shaft 30. A pair of straps 33 bolted or otherwise secured adjacent the rear end of the draw bar 22, extend rearwardly and outwardly from either side of the draw bar and have their rear ends twisted and circularly curved to form additional bearings for the shaft 30 adjacent the outer ends of the strap 29.

A pair of bars 34 are bolted or otherwise secured preferably to the outer sides of the longitudinal frame members 10 of the automobile and extend rearwardly therefrom. A channel shaped bar 35 is pivoted at its angular ends respectively to the inner ends of the bars 34. A substantially U-shaped frame 36 is pivotally secured at the inner side of the ends of its legs to the outer sides of the bar 34. A substantially U-shaped brace 37 fits snug against the channel shaped bar 35 and is bolted thereto and to the legs of the frame 36. Accordingly, channel bar 35, frame 36 and brace 37 are rigidly secured together and mounted for pivotal movement on the rear ends of bars 34. Secured to the frame 36 and to the U-shaped brace 37 a Y-shaped camway is formed, the legs of the Y extending rearwardly and the base or stem of the Y extending forwardly. Said camway is formed from two oppositely rearwardly and outwardly curved bars 38 having angular portions secured to the brace 37. A V-shaped guide 39, the point of the V extending forwardly is secured by angular bent end portions to the sides of the U-shaped frame 36 adjacent the rear end thereof, the curve formed by the V following the contour of the two curved bars 38 and being spaced at all points equidistant from the curved bars 38. The outer ends of the bars 38 are bolted or otherwise secured to the angularly bent portions of the V 39. A crank 40 has a vertical portion journaled within the bearing block 31, a horizontal portion extending forwardly therefrom, and a vertically bent end portion extending upwardly at the forward end of the horizontal portion, the vertical portion fitting within the camway formed by the bars 38. A cam roller 41 is mounted on the forward vertically extending portion of the crank 40, the cam being of slightly greater height than the height of the bars 38 and having horizontal flanges formed at top and bottom thereof. An arm 42 extends vertically upwardly from the channel shaped bar 35 above the height of the forward end of crank 40 and has secured thereto at its upper end one end of a tension spring 43, the other end of spring 43 being secured to a pin 44 extending through the upper end of the crank 40 and holding the cam 41 on the crank 40. The rear end of crank 40 extends downwardly below bearing block 31 and has rigidly secured thereto the tubular clamp 45. An arm 46 fits within clamp 45 and is rigidly and adjustably securable therein by set screw 47. The rear end of arm 46 has a ball formed thereon adapted to fit within a socket 48 secured to one end of a link 49. A similar socket 48' is secured at the other end of the link 49 and has fitting therein a ball portion 50 secured to tie rod 16 adjacent one end thereof. A tension spring 51 is secured at one end to an eye extending outwardly from the central portion of the forward end of the body 18 of the trailer and at its other end to an eye secured in the bearing block 31.

Operation.

The device of the invention having been secured to an automobile or other vehicle and to a four wheel trailer in the manner described, the operation of the device is as follows, as the vehicle takes a corner.

As the front wheels of the draft vehicle are turned when the vehicle is going at a fair speed there will be two forces acting upon the draw bar 22 and on the trailer. The inertia of the trailer when a left turn, for example, is taken will tend to swing the trailer to the right, that is to say, the trailer will tend to continue in the direction in which it is already traveling due to centrifugal force. The draft force exerted by the draft vehicle will tend to carry the trailer and draw bar to the left. Inasmuch as the relative position of the draft vehicle will be changed in respect to the draw bar and to the trailer the longitudinal axis of the draft vehicle will assume an acute angle with the draw bar. That is, the draft vehicle will follow the curvature of the road, while the draw bar will tend to continue in the original direction of travel. As the draft vehicle swings to the left in respect to the draw bar, cam roller 41 will contact the left curved bar 38 of the camway and will bear against the same moving outwardly, as further turning movement of the draft vehicle continues, towards the rear end of the left arm 38 of the Y-shaped camway. The front end of crank 40 will accordingly be turned to the right in respect to the draw bar, thereby actuating arm 46, arm 49 and tie rod 16 toward the left causing the front wheels 11 of the trailer to be turned to the left in respect to the longitudinal axis of the trailer. The amount of turn of the front wheels of the trailer will not be great until the draft vehicle has turned considerably. It is found that the trailer will continue practically up to the point where the draft vehicle is first turned before the front wheels of the trailer will be turned at all. The front wheels of the trailer will then be turned in the same manner as the front wheels of the draft vehicle, and the trailer will take the turn in the same manner as the draft vehicle. It is found that the trailer will pivot on a left turn approximately about an axis adjacent the left front wheel of the trailer. The trailer body accordingly will follow approximately the direction of the resultant force exerted by the centrifugal force aroused in turning and the draft force exerted upon the trailer by the draft vehicle. The dotted lines in Fig. 1 illustrate the extreme position that the body and front wheels of the trailer will take when the shortest possible corner is turned. The trailer will cut the corner taken in the turn much closer than the draft vehicle. Accordingly, the speed of the trailer about the turn will be less than that of the draft vehicle, due to the fact that the trailer will take a shorter path in its turn than the draft vehicle. There will thus be less danger of the trailer tipping over than of the draft vehicle turning over as a turn is taken. Also due to the fact that the wheels of the trailer will cut in on the corner from the path taken by the draft vehicle there will be no whipping action produced on the trailer and thus the chief trouble hitherto found in providing a satisfactory trailer coupling will be obviated.

When the lead vehicle is again turned straight, upon arriving on a straight road after a left turn, the longitudinal axis of the vehicle will be turned to more nearly conform to the longitudinal axis of the draw bar of the trailer, thereby causing crank 40 to swing to the left, turning the front wheels of the trailer towards the right as the vehicle continues in motion. The front wheels of the trailer will then eventually follow directly behind the rear wheels of the draft vehicle as the straight path is continued. It will of course be understood that as a right turn is taken the movement of the various parts of the device will be in just opposite directions from that described.

Due to the fact that frame 36 is pivoted to the bars 35 for vertical swinging movement and also to the fact that cam roller 41 is of greater length than the width of the bars 38, the rear end of frame 36 may be raised or lowered without danger of any of the parts binding as bumps are struck by either the lead vehicle or the trailer, or as the rear wheels of the lead vehicle strike different levels from the front wheels of the trailer. The hook and eye construction of the hitch will permit swinging movement of the draw bar in either a vertical or horizontal plane, so that the bar 40 may be raised or lowered or turned as bumps or various levels in the road are reached. The ball and socket joints on the arm 46, link 49 and the tie rod 16 will permit vertical play in these parts without any danger of breakage thereof. Shaft 30 will permit vertical swinging movement of the rear end of the draw bar in respect to the trailer chassis.

To detach the trailer from the lead vehicle keeper 26 may be raised by grasping the handle portion 26$^b$ thereof whereupon eye strap 23 may be disengaged from hook 21. Pin 44 may then be withdrawn from the upper end of the crank 40 and the upper forward end of the crank slipped through the cam roller 41.

When the device is in operation spring 43 will tend to center the upper end of the crank 40 and the cam roller 41 within the Y-shaped camway and due to the fact that the forward end of spring 43 is raised about the rear end thereof the upper end of the crank 40 will always tend to be raised upwardly.

With the present device, due to the fact that the front wheels of the trailer will cut inwardly on a turn from the path taken by the rear wheels of the draft vehicle it can be seen that the lead vehicle with trailer attached can be readily turned around in very short space. The lead vehicle with trailer attached can be readily backed up and the trailer will be steered while the lead vehicle is backing without any danger that the trailer will be swung off the road. If desired frame 36 and V-shaped member 39 may be entirely removed from the device, the purpose of said frame and member being merely to brace and strengthen the camway 38. If this were done the camway 38 would be more heavily constructed.

The relative degree of turn of the front wheels of the trailer, as the crank 40 is moved a certain distance to the right or left of draw bar 22 may be adjusted by unscrewing the set screw 47 on tubular clamp 45 and sliding arm 46 forwardly or rearwardly through the clamp to position the ball end of arm 46 at greater or less distance from clamp 45. The length of the lever arm of arm 46 may accordingly be varied thereby causing greater or less movement of link 49, tie rod 16, spindles 15 and wheels 11.

The device has been proved to be very successful and efficient in actual practice. Although the inventor contemplates the use of the device chiefly with four wheel trailers, it will, of course, be understood that the same can be used with two wheel trailers and will be equally effective for steering the same. If desired a number of trailers provided with the present steering coupling may be drawn one behind another by a lead vehicle.

It will, of course, be understood that various changes may be made in the form, details, arrangement and proportion of the various parts without departing from the scope of applicant's invention.

What is claimed is:

1. A steering coupling for trailers comprising a draw bar adapted to be pivotally secured at one end to a draft vehicle for swinging movement in respect to said draft vehicle, and adapted to be secured at its other end to a trailer, means for steering the front traction means of said trailer, and a single member journaled in said draw bar, connected to said steering means at one end and having its other end working in said camway, said camway being so shaped that said steering means will be positively moved to either the right or the left by said member as relative swinging movement takes place between said draw bar and said draft vehicle.

2. The structure defined in claim 1, and means for adjusting said steering means to vary the degree that said front traction means of said trailer will be steered as said swinging movement between said draw bar and said draft vehicle takes place.

3. A steering coupling for trailers comprising a draw bar adapted to be pivotally secured at one end to a draft vehicle for swinging movement in respect to said draft vehicle and adapted to be secured at its other end to a trailer, a substantially Y-shaped camway securable to the draft vehicle, a member journaled in said draw-bar and having a portion thereof working within said camway, said member being adapted to be turned as relative swinging movement between said draw bar and said draft vehicle takes place, and means connected to said member for steering the front traction means of the trailer.

4. A steering coupling for trailers comprising a draw bar adapted to be pivotally secured at one end to a draft vehicle for swinging movement in respect to said draft vehicle and adapted to be secured at its other end to a trailer, a substantially Y-shaped camway securable to the draft vehicle, a crank journaled in said draw bar, one end of said crank having a cam thereon working within said camway, said crank being adapted to be turned as relative swinging movement between said draw bar and said draft vehicle takes place, and means connected to the other end of said crank for steering the front traction means of the trailer.

5. The structure set forth in claim 4, said steering means being adjustable to vary the relative degree that said traction means of the trailer will be steered as said crank is turned.

6. In combination with a draft vehicle, and a four wheeled trailer having a tie rod for steering the front wheels thereof, a steering coupling comprising a draw bar secured to the front end of the trailer and pivotally secured to the draft vehicle for relative swinging movement in respect thereto, a substantially Y-shaped camway secured to the draft vehicle, a crank journaled within said draw bar and having a cam at one end thereof working within said camway, an arm secured to the other end of said crank and a link pivoted to said arm and to the tie rod of said trailer whereby as relative swinging movement between the lead vehicle and said draw bar takes place, said cam will ride in said camway to turn said crank and the front wheels of the trailer will be turned.

7. In combination with a lead vehicle and a four wheeled trailer having therein a tie rod for steering the front wheels thereof, a draw bar pivotally secured at one end to said trailer for vertical swinging movement in respect thereto and adapted to be pivotally secured at its other end in respect to a draft vehicle, for both relative, vertical and horizontal swinging movement, a Y-shaped camway pivotally secured to the draft vehicle for swinging movement in but a vertical plane, a crank journaled within said draw bar, a cam secured to one end of said crank and working within said camway, an arm secured to the other end of said crank and a link connected by a ball and socket joint to said arm and also connected by a ball and socket joint to said tie rod.

8. The structure set forth in claim 7, the portion of said arm connected to said link being adapted to be spaced at varying lengths from the last mentioned end of said crank.

9. A four wheeled trailer having in combination a body, steering spindles with spindle arms thereon upon which the front wheels are journaled, a tie rod connecting the spindle arms of the front wheels, a draw bar connected at one end to said trailer body and having an eye at its other end, a bracket adapted to be secured to a draft vehicle having a hook thereon adapted to engage with said eye, a spring pressed keeper adapted to be held over said eye to hold the same in engagement with said hook, a Y-shaped camway adapted to be secured to said draft vehicle, a crank journaled within said draw bar, one end of said crank having a cam thereon adapted to work within said camway, an arm secured to the other end of said crank and a link pivoted to said arm and to said draw bar, said cam being adapted to be moved toward the outer end of one of the legs of said Y-shaped camway as relative horizontal swinging movement takes place between said draft vehicle and said draw bar, whereby the front wheels of the trailer will be turned.

10. The structure set forth in claim 9, and means for automatically centering said cam in the stem of said Y-shaped camway.

In testimony whereof I affix my signature.

BASIL J. MURN.